(12) United States Patent
Kishiyama et al.

(10) Patent No.: US 7,979,071 B2
(45) Date of Patent: Jul. 12, 2011

(54) USER APPARATUS, BASE STATION, AND METHOD IN MOBILE COMMUNICATION SYSTEM

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 283 days.

(21) Appl. No.: 12/304,247

(22) PCT Filed: Jun. 13, 2007

(86) PCT No.: PCT/JP2007/061940
§ 371 (c)(1),
(2), (4) Date: Feb. 26, 2009

(87) PCT Pub. No.: WO2007/148589
PCT Pub. Date: Dec. 27, 2007

(65) Prior Publication Data
US 2009/0325579 A1    Dec. 31, 2009

(30) Foreign Application Priority Data
Jun. 19, 2006    (JP) ................. 2006-169447

(51) Int. Cl.
*H04Q 7/20* (2006.01)
(52) U.S. Cl. ............ 455/436; 455/550.1; 455/450; 370/329
(58) Field of Classification Search ............ 455/436, 455/550.1, 450; 370/329
See application file for complete search history.

(56) References Cited

U.S. PATENT DOCUMENTS

| | | | | |
|---|---|---|---|---|
| 6,775,552 | B2 * | 8/2004 | Link, II | 455/456.1 |
| 6,928,066 | B1 * | 8/2005 | Moon et al. | 370/342 |
| 7,817,597 | B2 * | 10/2010 | Usuda et al. | 370/329 |
| 2005/0059408 | A1 * | 3/2005 | Tiedemann et al. | 455/452.1 |
| 2005/0118981 | A1 * | 6/2005 | Laroia et al. | 455/343.3 |
| 2005/0245264 | A1 * | 11/2005 | Laroia et al. | 455/445 |
| 2007/0189199 | A1 | 8/2007 | Nishio | |

FOREIGN PATENT DOCUMENTS

| | | |
|---|---|---|
| JP | 2004-159370 A | 6/2004 |
| WO | 2005/096522 A1 | 10/2005 |

OTHER PUBLICATIONS

International Search Report issued in PCT/JP2007/061940, mailed on Aug. 14, 2007, with translation, 3 pages.
Written Opinion issued in PCT/JP2007/061940, mailed on Aug. 14, 2007, 4 pages.
3GPP, R1-061184, NTT DoCoMo et al., "Random Access Channel Structure for E-UTRA Uplink," TSG RAN WG1 Meeting #45, Shanghai, China, May 8-12, 2006, 13 pages.

* cited by examiner

*Primary Examiner* — Danh C Le
(74) *Attorney, Agent, or Firm* — Osha • Liang LLP (57) ABSTRACT

A disclosed user apparatus includes a random access channel generating unit configured to generate a random access channel; a control channel generating unit configured to generate a control channel in accordance with scheduling information received from a base station; and an uplink transmission signal generating unit configure to generate an uplink transmission signal including the random access channel or the control channel. Further, the purpose ID indicating at least whether there is a user ID uniquely allocated by the base station is included in the random access channel or the control channel.

8 Claims, 6 Drawing Sheets

| PURPOSE ID | C-RNTI | EVENTS RESULTING IN RACH TRANSMISSION | CONTENT OF SUBSEQUENT CONTROL CHANNEL | DATA SIZE OF SUBSEQUENT CONTROL CHANNEL |
|---|---|---|---|---|
| #1 | NOT INCLUDED | INITIAL ACCESS | L3 MESSAGE | LARGER |
|  |  | UL DATA TRANSMISSION |  |  |
|  |  | DL DATA TRANSMISSION |  |  |
|  |  | HANDOVER FAILURE |  |  |
| #2 | INCLUDED | UL DATA TRANSMISSION | SCHEDULING REQUEST | SMALLER |
| #3 |  | DL DATA TRANSMISSION | UL SYNCHRONIZATION REQUEST |  |
| #4 |  | HANDOVER COMPLETION | HANDOVER COMPLETE ANNOUNCEMENT |  |

| DL CQI | PURPOSE ID #1 | PURPOSE ID #2 | PURPOSE ID #3 | PURPOSE ID #4 |
|---|---|---|---|---|
| VERY HIGH | 1, 2 | | | |
| HIGH | 3, 4, 5 | 17, 18 | 23, 24 | |
| MIDDLE | 6, 7, 8, 9 | | | 29, 30 |
| LOW | 10, 11, 12, 13 | 19, 20 | 25, 26 | |
| VERY LOW | 14, 15, 16 | 21, 22 | 27, 28 | 31, 32 |

US 7,979,071 B2

USER APPARATUS, BASE STATION, AND METHOD IN MOBILE COMMUNICATION SYSTEM

TECHNICAL FIELD

The present invention relates to a technical field of mobile communications, and more particularly to a user apparatus, a base station, and a method in a mobile communication system.

BACKGROUND ART

Recently, research and development efforts of technologies for a next-generation communication system have been intensively made in this technical field. In the next-generation communication system, it is assumed that a single-carrier method is to be employed in uplink transmission due to its reduced Peak-to-Average Power Ratio (PAPR) and wider coverage area.

Further, the radio resources are allocated in a format of the shared channel shared among plural users in accordance with the channel status of each user. The process of determining the allocation of the radio resources for transmitting a data channel or the like may be called "scheduling". When the "scheduling" is performed, the base station properly allocates the frequencies and time (slots). Therefore, no contention occurs between different users. Because of this feature, the channel transmitted based on the scheduling may be called a scheduled channel or a contention-free channel. On the other hand, there is provided a channel for, for example, requesting to allocate resources. Such a channel may be called a contention-based channel or a random access channel (RACH). The random access channel (RACH) is transmitted at any timing and may be in conflict with the channel of other user apparatus. Heretofore, known random access channels (RACH) at the time of the present invention are described in Non Patent Document 1.

Non Patent Document 1: 3GPP, R1-061184, NTT DoCoMo et al., "Random Access Channel Structure for E-UTRA Uplink", TSG RAN WG1 Meeting #45, Shanghai, China, 8-12 May, 2006

DISCLOSURE OF INVENTION

Problems To Be Solved By The Invention

A conventional random access channel (RACH) transmits information simply indicating that there are some data (message) to be transmitted later. Because of the limited information, the data (message) transmission may not be started till the transmission of control channels (CCH) is completed. In other words, the overhead of the communication may be disadvantageously increased.

The present invention is made in light of the circumstance, and an object of the present invention is to reduce the number of transmitting times of the control channels (CCH) in uplink transmission and downlink transmission following the transmission of the random access channel (RACH).

Means For Solving the Problems

According to an aspect of the present invention, a user apparatus includes a random access channel generating unit configured to generate a random access channel; a control channel generating unit configured to generate a control channel in accordance with scheduling information received from a base station; and an uplink transmission signal generating unit configure to generate an uplink transmission signal including the random access channel or the control channel. Further, the purpose ID indicating at least whether there is a user ID uniquely allocated by the base station is included in the random access channel or the control channel.

Advantageous Effect of the Invention

According to an aspect of the present invention, the number of transmitting times of the control channels (CCH) in uplink transmission and downlink transmission following the transmission of the random access channel (RACH) may be reduced.

EXPLANATION OF REFERENCES

11 RACH PREAMBLE SIGNAL CONTROLLING SECTION
12 RACH PREAMBLE TRANSMITTING SECTION
13 DOWNLINK CONTROL BITS RECEIVING SECTION
14 UPLINK CONTROL BITS CONTROLLING SECTION
15 UPLINK CONTROL BITS TRANSMITTING SECTION
21 RACH PREAMBLE RECEIVING SECTION
22 DOWNLINK CONTROL BITS CONTROLLING SECTION
23 DOWNLINK CONTROL BITS TRANSMITTING SECTION
24 UPLINK CONTROL BITS RECEIVING SECTION

BEST MODE FOR CARRYING OUT THE INVENTION

According to an embodiment of the present invention, there is introduced a "purpose ID" indicating the content of the subsequent control channel (CCH). By using the purpose ID, it becomes possible to promptly allocate the resources in accordance with the content (purpose) of the subsequent control channel. As a result, the number of transmission times of the control channels (CCH) in uplink and downlink transmission following the transmission of the random access channel (RACH) may be advantageously reduced.

In the following, several exemplary embodiments are described. However, it should be noted that the present invention is not limited to the described embodiments, and, for example, two or more embodiments described below may be adequately combined when it may be necessary.

Embodiment 1

Figure 1:
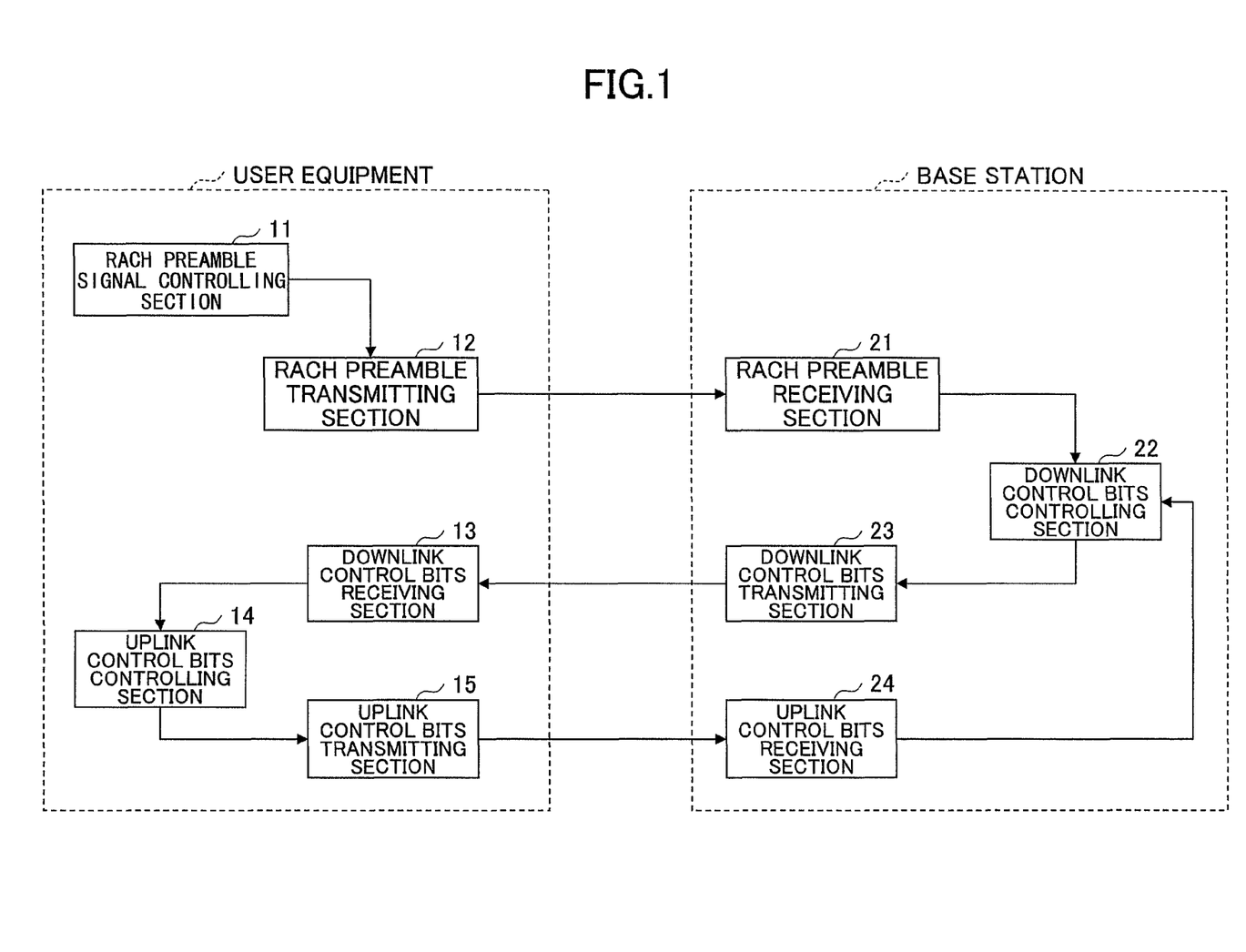
FIG. 1 is a schematic drawing showing a configuration of a user apparatus and a base station according to an embodiment of the present invention.

FIG. 1 shows a mobile communication system including a user apparatus and a base station according to an embodiment of the present invention. As shown in FIG. 1, the user apparatus includes a random access channel (RACH) preamble signal controlling section 11, a RACH preamble transmitting section 12, a downlink control bits receiving section 13, an uplink control bits controlling section 14, and an uplink control bits transmitting section 15. On the other hand, the base station includes a RACH preamble receiving section 21, a downlink control bits controlling section 22, a downlink control bits transmitting section 23, and an uplink control bits receiving section 24.

The RACH preamble signal controlling section 11 performs, for example, the determination of the content and the transmission of the random access channel (RACH). As described below, the random access channel (RACH) may include a random ID such as a signature, a purpose ID, a downlink channel quality indicator (CQI), and such items may be determined by the RACH) preamble signal controlling section 11.

The RACH preamble transmitting section 12 transmits the random access channel (RACH) in accordance with determined items.

The downlink control bits receiving section 13 receives a control channel (CCH) and acquires control information items. In addition to the information items attached to the data channel such as signaling information of allocating resources, the control information items may further include such as transmission confirmation information like "ACK/NACK" and CQI to be transmitted regardless of the status of a data channel.

The uplink control bits controlling section 14 determines the control information items transmitted via uplink.

The uplink control bits transmitting section 15 transmits the control information items through an uplink control channel, the control information items being determined by the uplink control bits controlling section 14.

The RACH preamble receiving section 21 receives the random access channel (RACH) from the user apparatus.

The downlink control bits controlling section 22 determines the content of the downlink control channel in accordance with a purpose of the random access channel (RACH).

The downlink control bits transmitting section 23 transmits the content through the downlink control channel, the content being determined by the downlink control bits controlling section 22.

The uplink control bits receiving section 24 receives the uplink control channel and extracts the control information.

Figure 2:
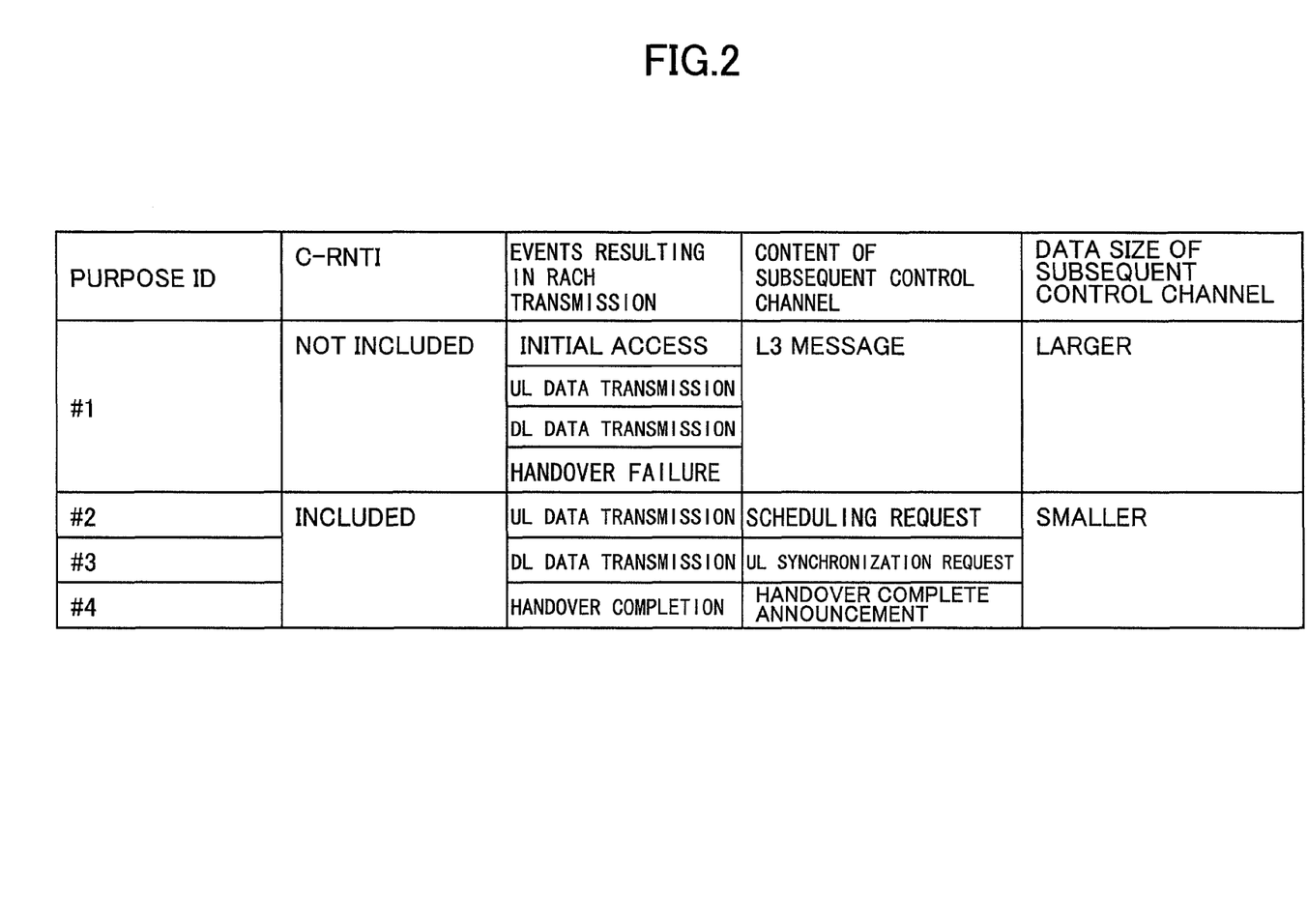
FIG. 2 is a drawing showing a relationship between a random access channel (RACH) and the subsequent control channel (CCH)

FIG. 2 shows a relationship between a random access channel (RACH) and the subsequent control channel (CCH). The random access channel (RACH) is transmitted to notify the base station that the user apparatus is being ready to transmit some data. The purpose ID is an information item introduced in this embodiment and refers to an identifier indicating a type of the random access channel (RACH). The second column from the left end shows whether a cell-specific radio network temporary identifier (C-RNTI) is allocated to the user apparatus. The "C-RNTI" is uniquely allocated by a base station to each user apparatus in the cell of the base station. Whether the "C-RNTI" is allocated to the user apparatus is determined by checking whether the value of the purpose ID is "#1". There are various events likely to cause the transmission of the random access channel (RACH). The "initial access" is an event where the user apparatus is turned ON or the operations of the user apparatus are resumed after relatively long period of halted operations. The "UL data transmission" is an event where the user apparatus requests uplink data transmission. The "DL data transmission" is an event where the user apparatus requests downlink data transmission. The "handover failure" is an event where communication is interrupted due to handover failure for some reason. Each of these events results in the transmission of the random access channel (RACH). In this case, in the subsequent control channel (CCH), messages such as the "C-RNTI" is to be added to the user apparatus, the user apparatus is to be managed at the cell level, and the like are transmitted to the base station as an L3 message. Because of this feature, the data size of the L3 message may become relatively large.

When the purpose ID is any of "#2" through "#4", the C-RNTI is already allocated to the user apparatus. In this case, same as the case where the C-RNTI is not allocated, the "UL data transmission" is an event where the user apparatus requests uplink data transmission, and the "DL data transmission" is an event where the user apparatus requests downlink data transmission. However, since the C-RNTI is already allocated, in the event of the "UL data transmission", a scheduling request may be transmitted by the subsequent control channel (CCH); and in the event of the "DL data transmission", downlink channel status may be periodically reported to the base station (as a CQI report), and based on the report, the base station allocates downlink radio resource. In this case, it is necessary to establish uplink synchronization so that the CQI report is periodically transmitted. To that end, a uplink synchronization request is transmitted after the transmission of the random access channel (RACH). The "handover completion" is an event where the handover is completed. In this case, the user apparatus announces the new base station (target base station) that the handover is completed. Accordingly, when the purpose ID is any of "#2" through "#4", the amount of information transmitted through the control channel (CCH) may be relatively small. This is because the C-RNTI is already allocated and the event is already specified by the purpose ID. It should be noted that a method of classifying the purpose ID is not limited to the method as illustrated in FIG. 2, and various other method may be used. However, preferably, the contents of each purpose ID are to be determined in advance.

Figure 3:
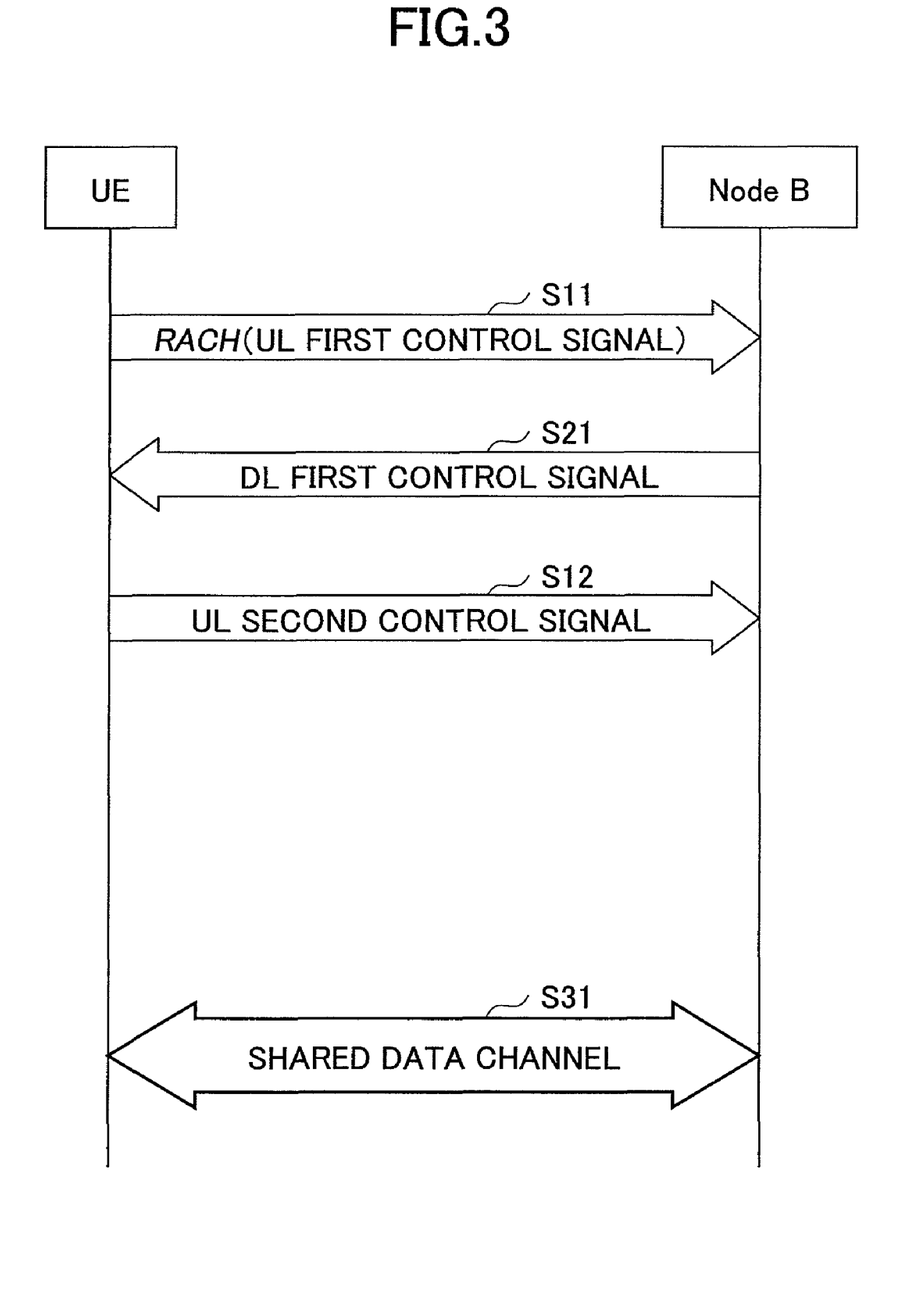
FIG. 3 is a sequence diagram showing exemplary operations according to a first embodiment of the present invention.

FIG. 3 is a sequence diagram showing exemplary operations according to a first embodiment of the present invention. As shown in FIG. 3, in step S11 (uplink first control signal), the random access channel (RACH) is transmitted from the user apparatus (UE) to the base station (Node B). The event resulting in the transmission of the random access channel (RACH) may be any of the events in the third column from the left end of the table in FIG. 2. The random access channel (RACH) may include the following information items:

signature;
purpose ID; and
downlink CQI on as-needed basis.

The signature may be also called a random ID and is an identifier prepared for the random access channel (RACH) in the cell. Further, the signature is selected by the user apparatus, and is different from the C-RNTI which is uniquely allocated to the user apparatus by the base station. Because of this feature, the same signature may be selected among different user apparatus. The purpose IDs are listed in the left end column of FIG. 2. The random access channel (RACH) may include preferably, but not necessarily, the CQI indicating downlink channel status. For example, when enough number of bits is not allocated in the random access channel (RACH), the CQI may not be included.

In step S21 (downlink first control signal), the control channel (CCH) is transmitted from the base station to the user apparatus. The control channel may include the following information items:
  timing information;
  uplink scheduling information; and
  C-RNTI (when the purpose ID is "#1"). The timing information is used for establishing uplink synchronization. More specifically, the propagation delay caused by the distance between the base station and the user apparatus may be compensated for by considering the timing information. The scheduling information is determined by considering the kind of purpose ID and the downlink CQI (when included in the RACH), and specifies the content of the resources allocated to the user apparatus for uplink transmission. The content of the resources are specified by a frequency resource block, a time slot (or sub-frame), a modulation type, a channel encoding rate, and the like. The resource allocated to the downlink control channel (CCH) for announcing the scheduling information to the user apparatus may be determined in accordance with the reported downlink CQI (This is possible when the downlink CQI is included in the RACH in step S11). Since the kind of purpose ID is being considered, whether a larger or smaller data size is required in the subsequence control channel (CCH) may be determined at this point. As a result, the scheduling may be performed in consideration of the required data size. Further, when the purpose ID is "#1", the fact that the C-RNTI is not allocated may become immediately apparent. Therefore, the C-RNTI may be allocated and announced as early as in step S21.

In step S12 (uplink second control signal), the control channel (CCH) is transmitted from the user apparatus to the base station. The control channel (CCH) may include the following information items:
  L3 message (when the purpose ID is "#1");
  scheduling request (when the purpose ID is "#2");
  uplink synchronization request (when the purpose ID is "#3"); and
  handover completion announcement (when the purpose ID is "#4").
The content of those information items are already described, therefore, repeated descriptions are omitted. According to this embodiment, those information items may be transmitted from the user apparatus as early as next to the transmission of the random access channel (RACH).

In step S31, communications are performed based on the scheduling information transmitted through the control channel (CCH).

Embodiment 2

Figure 4:
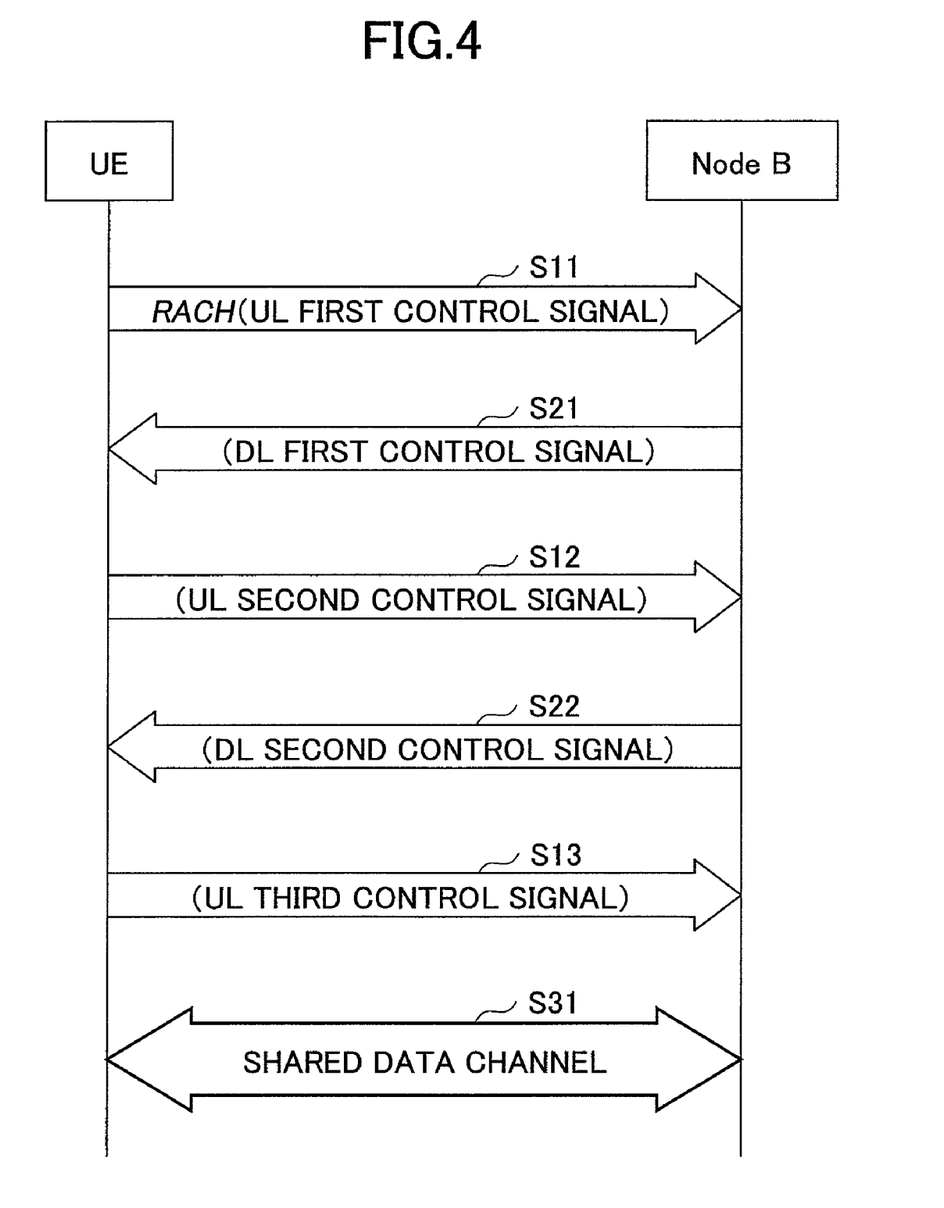
FIG. 4 is a sequence diagram showing exemplary operations according to a second embodiment of the present invention.

FIG. 4 is a sequence diagram showing exemplary operations according to a second embodiment of the present invention. As shown in FIG. 4, in step S11 (uplink first control signal), the random access channel (RACH) is transmitted from the user apparatus (UE) to the base station (Node B). The event resulting in the transmission of the random access channel (RACH) may be any of the events in the third column from the left end of the table in FIG. 2. The random access channel (RACH) may include the following information items:
  signature; and
  downlink CQI on as-needed basis.

The signature and the downlink CQI are the same as those in the first embodiment. Therefore, repeated descriptions are omitted.

In step S21 (downlink first control signal), the control channel (CCH) is transmitted from the base station to the user apparatus. The control channel may include the following information items:
  timing information; and
  uplink scheduling information.
The timing information and the scheduling information are the same as those in the first embodiment. Therefore, repeated descriptions are omitted. Unlike the first embodiment, the purpose ID is not included in the random access channel (RACH). Therefore, at this moment, it is not possible to determine whether the C-RTNI is allocated. Accordingly, even when the C-RNTI is not allocated, the allocation and the announcement of the C-RNTI to the user apparatus are not performed at this moment. Further, at this moment, it is not apparent which control channel (CCH) is to be transmitted from the user apparatus. Therefore, it is preferable that the resource allocated to the subsequent control channel (CCH) has a certain fixed size.

In step S12 (uplink second control signal), the control channel (CCH) is transmitted from the user apparatus to the base station. The control channel (CCH) may include the following information items:
  purpose ID;
  uplink scheduling request; and
  downlink CQI on as-needed basis.
In this embodiment, the purpose ID is included in the control channel (CCH). By detecting the type of the purpose ID, the base station becomes to know what is related to the information to be transmitted from the user apparatus.

In step S22 (downlink second control signal), the control channel (CCH) is transmitted from the base station to the user apparatus. The control channel may include the following information items:
  uplink scheduling information; and
  C-RNTI (when the purpose ID is "#1").
The scheduling information is determined by considering the kind of purpose ID and the downlink CQI (when included in the second control signal), and specifies the content of the resources allocated to the user apparatus for uplink transmission. The resource allocated to downlink control channel for announcing the scheduling information to the user apparatus may be determined based on the reported downlink CQI. Since the kind of purpose ID is determined, the data size required in the subsequent uplink control channel (CCH) may be determined, thereby enabling the scheduling in consideration of the required data size. Further, when the purpose ID is "#1", the fact that the C-RNTI is not allocated becomes apparent. Therefore, the base station allocates and announces the C-RNTI to the user apparatus.

In step S13 (uplink third control signal), same as step S12 in the first embodiment, the control channel (CCH) is transmitted from the user apparatus to the base station. The control channel (CCH) may include the following information items:
  L3 message (when the purpose ID is "#1");
  scheduling request (when the purpose ID is "#2");
  uplink synchronization request (when the purpose ID is "#3"); and
  handover completion announcement (when the purpose ID is "#4").
The content of those information items are already described, therefore, repeated descriptions are omitted. The amount of information items transmitted through the control channel (CCH) largely differs depending on the purpose or the content of the information items. Therefore, it is preferable that the resource amount (data size) allocated to the control channel (CCH) may be dynamically changed in each case, which is different from the case of the control channel (CCH) in step S12 where preferably, the resource has a certain fixed size.

In step S31, communications are performed based on the scheduling information transmitted through the control channel (CCH).

In this embodiment, one extra round-trip transmission of the control channel (CCH) is added compared with the case of the first embodiment. Therefore, the start of the communications through the shared data channel may be delayed due to the extra transmission. Instead, unlike the first embodiment, it should be noted that the purpose ID is not included in the random access channel (RACH). In this embodiment, the number of transmission bits in the random access channel (RACH) may be reduced because the purpose ID is not included in the random access channel (RACH) compared with the first embodiment. This may be desirable from the viewpoint of transmitting the random access channel (RACH) further and with a prescribed quality.

Embodiment 3

Figure 5:
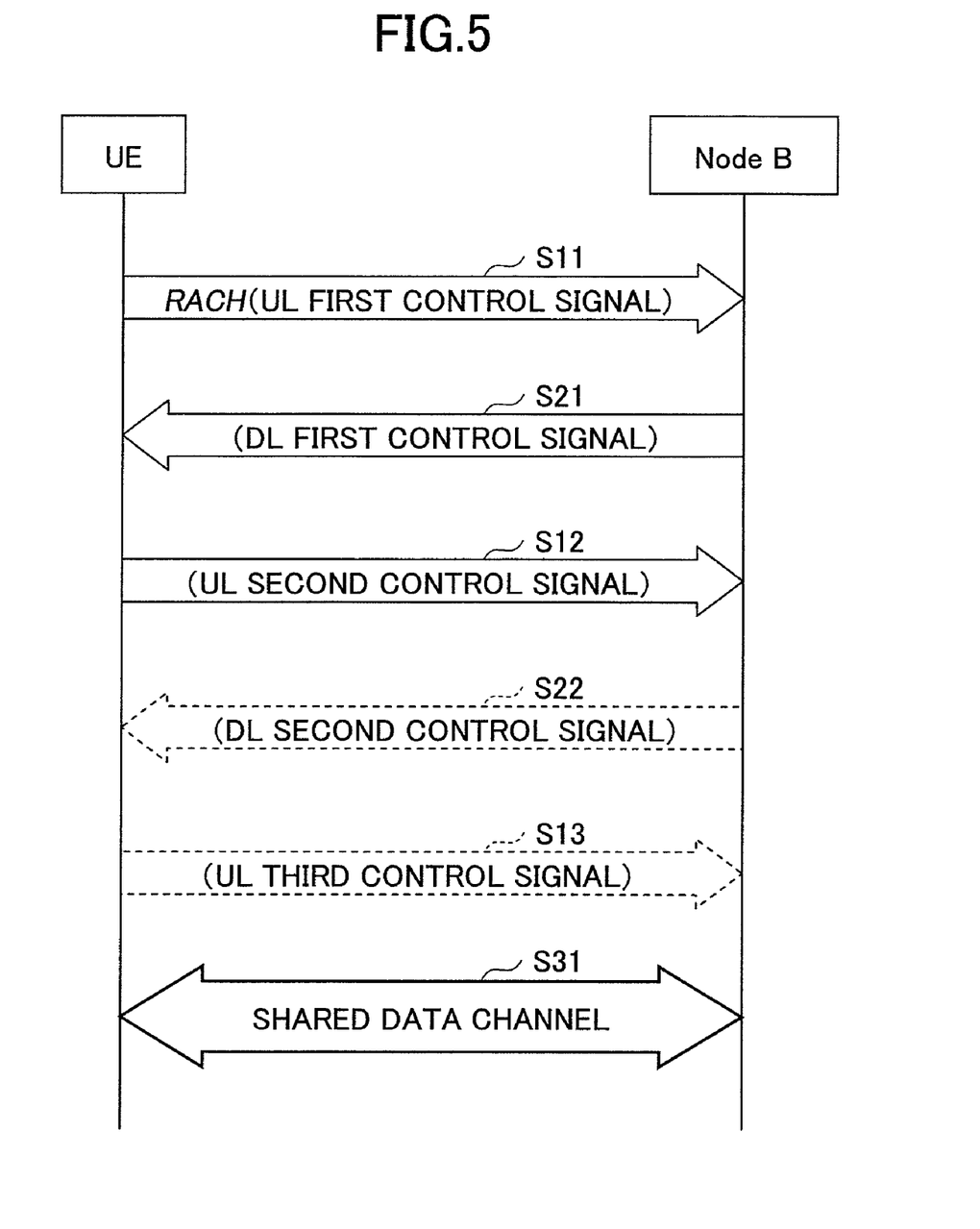
FIG. 5 is a sequence diagram showing exemplary operations according to a third embodiment of the present invention.

FIG. 5 is a sequence diagram showing exemplary operations according to a third embodiment of the present invention. According to this embodiment, generally, when the purpose ID is "#1", the same operations as those in the second embodiment are performed, and when the purpose ID is other than "#1", the same operations as those in the first embodiment are performed.

As shown in FIG. 5, in step S11 (uplink first control signal), the random access channel (RACH) is transmitted from the user apparatus (UE) to the base station (Node B). The event resulting in the transmission of the random access channel (RACH) may be any of the events in the third column from the left end of the table in FIG. 2. The random access channel (RACH) may include the following information items:
  signature; and
  downlink CQI on as-needed basis.
The signature and the downlink CQI are the same as those in the first embodiment. Therefore, repeated descriptions are omitted.

In step S21 (downlink first control signal), same as step S21 in the second embodiment, the control channel (CCH) is transmitted from the base station to the user apparatus. The control channel may include the following information items:
  timing information; and
  uplink scheduling information.

In step S12 (uplink second control signal), the control channel (CCH) is transmitted from the user apparatus to the base station. The control channel (CCH) may include the following information items:
  purpose ID;
  uplink scheduling request;
  downlink CQI on as-needed basis;
  scheduling request (when the purpose ID is "#2");
  uplink synchronization request (when the purpose ID is "#3"); and
  handover completion announcement (when the purpose ID is "#4").
In this embodiment, the purpose ID is included in the control channel (CCH). By detecting the type of the purpose ID, the base station becomes to know what is related to the information to be transmitted from the user apparatus. Unlike the second embodiment, in this embodiment, the scheduling request (when the purpose ID is "#2"), the uplink synchronization request (when the purpose ID is "#3"), or the handover completion announcement (when the purpose ID is "#4") is transmitted at this moment. Unlike the case where the purpose ID is "#1", since the data size of any of those information items is relatively small, any of those information items may be transmitted through this uplink second control channel. Therefore, the data size for the second control channel having a certain fixed size is to be determined so that at least any of the above information items is stored. However the determined data size may not become excessively large. According to this embodiment, when the purpose ID is any of "#2" through "#4", the control information items to be transmitted may be transmitted as early as in the first embodiment.

In step S22 (downlink second control signal), same as step S22 in the second embodiment, the control channel (CCH) is transmitted from the base station to the user apparatus. The control channel may include the following information items:
  uplink scheduling information; and
  C-RNTI (when the purpose ID is "#1").

In step S13 (uplink third control signal), the control channel (CCH) is transmitted from the user apparatus to the base station. The control channel (CCH) may include the following information item:
  L3 message (when the purpose ID is "#1").
Any of the information items when the purpose ID is other than "#1" may be transmitted in step S12. In this embodiment, same as the second embodiment, the L3 message when the purpose ID is "#1" is transmitted at this moment.

In step S31, communications are performed based on the scheduling information transmitted through the control channel (CCH).

According to this embodiment, the number of bits in the random access channel (RACH) may be reduced same as in the second embodiment, the control information items may be transmitted earlier as in the first embodiment when the purpose ID is any of "#2" through "#4", and the control information may be transmitted earlier as in the second embodiment when the purpose ID is "#1", thereby creating a multiplier effect.

Embodiment 4

Figure 6:
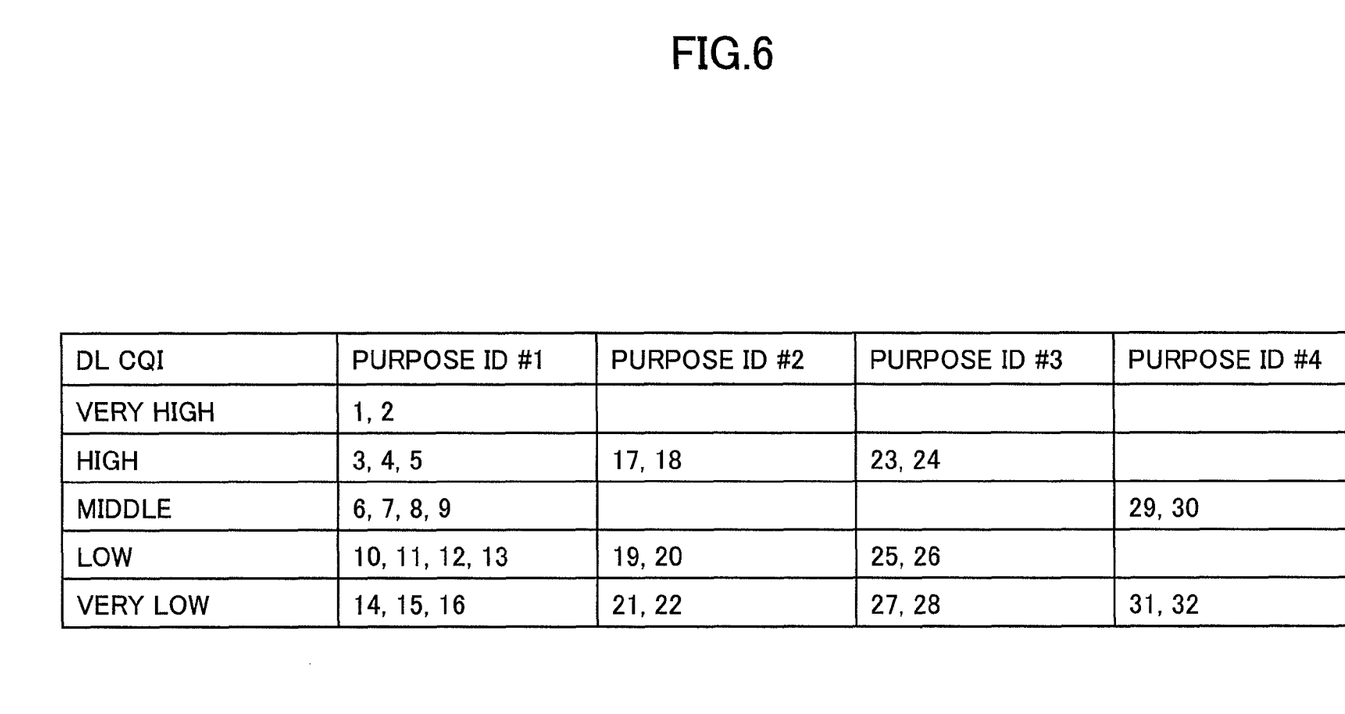
FIG. 6 is a table where signatures are allocated in accordance with a purpose ID and a CQI.

FIG. 6 is an exemplary table where signatures are allocated in accordance with the purpose ID and the CQI. In FIG. 6, the figures "1" through "32" denote 32 signatures. In this embodiment, as shown in FIG. 6, the signatures are classified depending on the purpose ID and the levels of the downlink CQI. For example, the signature "1" or "2" corresponds to a case where the purpose ID is "#1" and the level of the downlink CQI is very high (good). Therefore, for example, when the random access channel (RACH) including the signature "1" is transmitted from the user apparatus, the base station recognizes that the user apparatus has data that are related to the purpose ID "#1" and that are to be transmitted, and that the level of the downlink CQI is very high. According to this embodiment, by classifying the signatures by the user apparatus in accordance with a prescribed corresponding relationship between the signature with respect to the downlink CQI and the purpose ID, the base station may detect the kind of purpose ID and the level of the CQI based on the corresponding relationship even when no information indicating the purpose ID and the CQI is transmitted. As a result, the number of bits in the random access channel (RACH) may be reduced.

The numbers of kinds of the purpose ID and the levels of the CQI are not limited to the numbers shown in the figures, and various numbers may be used. Further, the corresponding relationship between the signature with respect to the downlink CQI and the purpose ID may be unchangeably maintained or adequately updated. In the latter case, the corresponding relationship is required to be announced to the user apparatus through the broadcast channel or by the other method. Further, in the example of FIG. 6, a larger number of signatures are allocated in the column where the purpose ID is "#1" and the level of the downlink CQI is "low" than any other columns. However, for example, a larger number of signatures may be allocated in a column where the purpose ID is other than "#1" or where the level of the downlink CQI is other than "low". Further, the corresponding relationship may be updated by statistically considering the frequency of the practical use of the purpose ID (frequency distribution), the distribution of the CQI, and the like. Otherwise, the corresponding relationship may be updated based on some signature distribution derived by experiences or simulations.

In the example of FIG. 6, the corresponding relationship between the signature with respect to the downlink CQI and the purpose ID is provided. However, for example, the corresponding relationship between the signature and the purpose ID may be used. In this case, the resource for transmitting the CQI is required in the random access channel (RACH) or the control channel (CCH). However, it is not necessary to directly transmit the purpose ID, thereby reducing the number of bits of the random access channel (RACH).

The present invention is described above by referring to a specific embodiment. However, a person skilled in the art may understand that the above embodiment is described for illustrative purpose only and examples of various modifications, transformations, alterations, changes, and the like. To promote an understanding of the present invention, the specific values are used as the examples through the descriptions. However, it should be noted that such specific values are just sample values unless otherwise described, and any other values may be used. For illustrative purpose, the apparatus according to an embodiment of the present invention is described with reference to the functional block diagram. However, such an apparatus may be provided by hardware, software, or combination thereof. The present invention is not limited to the embodiment described above, and various modifications, transformations, alteration, exchanges, and the like may be made without departing from the scope and spirit from the present invention.

The present international application claims priority from Japanese Patent Application No. 2006-169447 filed on Jun. 19, 2006, the entire contents of which are hereby incorporated herein by reference.

The invention claimed is:

1. A user apparatus comprising:
a random access channel generating unit configured to generate a random access channel;
a control channel generating unit configured to generate a control channel in accordance with scheduling information received from a base station; and
an uplink transmission signal generating unit configured to generate an uplink transmission signal including the random access channel or the control channel, wherein a purpose ID indicating at least whether there is a user ID uniquely allocated by the base station is included in the random access channel or the control channel.

2. The user apparatus according to claim 1, wherein the purpose ID indicates not only whether there is a user ID uniquely allocated but also that there are data to be transmitted later and that there is an announcement to be transmitted later, the announcement indicating that handover is completed.

3. The user apparatus according to claim 2, wherein the signatures selected by the user apparatus are also classified in advance in accordance with levels of downlink channel status.

4. The user apparatus according to claim 1, wherein signatures selected by the user apparatus are classified in advance in accordance with content indicated by the purpose ID.

5. The user apparatus according to claim 1, wherein the purpose ID is included in the random access channel.

6. The user apparatus according to claim 1, wherein the purpose ID is included in the control channel.

7. A method comprising:
a step of transmitting a random access channel including a signature from a user apparatus to a base station;
a step of allocating a radio resource for an uplink control channel to the user apparatus;
a step of transmitting a control channel from the user apparatus to the base station, the control channel including a purpose ID indicating at least whether there is a user ID uniquely allocated by the base station;
a step of allocating a radio resource for an uplink control channel to the user apparatus in accordance with at least content indicated by the purpose ID; and
a step of transmitting a control channel from the user apparatus to the base station by using the allocated radio resource.

8. A method comprising:
a step of transmitting a random access channel including a signature from a user apparatus to a base station;
a step of allocating a radio resource for an uplink control channel to the user apparatus;
a step of transmitting a control channel from the user apparatus to the base station, the control channel including a purpose ID indicating at least whether there is a user ID uniquely allocated by the base station, wherein the control channel including an information item indicating that there is the uniquely allocated user ID and that the user apparatus has data to be transmitted later or the user apparatus is scheduled to announce that handover is completed;
a step of allocating a radio resource for an uplink control channel to the user apparatus in accordance with at least content indicated by the purpose ID; and
a step of transmitting a control channel from the user apparatus to the base station by using the allocated radio resource.

* * * * *